United States Patent [19]

Kubo et al.

[11] Patent Number: 4,528,869
[45] Date of Patent: Jul. 16, 1985

[54] AUTOMATIC TRANSMISSION FOR VEHICLES

[75] Inventors: Seitoku Kubo; Koujiro Kuramochi, both of Toyota; Hajime Arai, Aichi, all of Japan

[73] Assignee: Toyota Jidosha Kogyo Kabushiki Kaisha, Japan

[21] Appl. No.: 201,154

[22] Filed: Oct. 27, 1980

Related U.S. Application Data

[63] Continuation of Ser. No. 943,484, Sep. 18, 1978, abandoned.

[30] Foreign Application Priority Data

Feb. 21, 1978 [JP] Japan .................................. 53-18112

[51] Int. Cl.$^3$ ...................... F16H 37/08; F16H 37/06
[52] U.S. Cl. ......................................... 74/695; 74/682
[58] Field of Search ............... 74/740, 763, 730, 695, 74/694, 682

[56] References Cited

U.S. PATENT DOCUMENTS

| | | | |
|---|---|---|---|
| 2,093,236 | 9/1937 | Dodge et al. | 74/688 |
| 3,035,455 | 5/1962 | Peras | 74/645 |
| 3,095,764 | 7/1963 | Peras | 74/763 |
| 3,302,740 | 2/1967 | Giacosa | 180/292 |
| 3,339,431 | 9/1967 | Croswhite et al. | 74/763 |
| 3,411,382 | 11/1968 | Mori | 74/695 |
| 3,482,469 | 12/1969 | Mori | 74/763 |
| 3,561,291 | 2/1971 | Webster et al. | 74/740 |
| 3,572,169 | 3/1971 | Fisher | 74/763 |
| 3,602,055 | 8/1971 | Hause et al. | 74/763 |
| 3,614,902 | 10/1971 | Candellero | 74/763 |
| 3,701,623 | 10/1972 | Mori et al. | 74/763 |
| 3,800,626 | 4/1974 | Koivunen | 74/695 |
| 3,802,294 | 4/1974 | Smirl | 74/740 |
| 3,812,739 | 5/1974 | Mori et al. | 74/763 |
| 3,926,073 | 12/1975 | Roche et al. | 74/763 |
| 3,958,655 | 5/1976 | Kronogard | 74/687 |
| 4,043,223 | 8/1977 | Ohnuma et al. | 74/740 |
| 4,056,986 | 11/1977 | Hobbs | 74/688 |
| 4,056,988 | 11/1977 | Kubo et al. | 74/695 |
| 4,095,487 | 6/1978 | Cartwright et al. | 74/695 |
| 4,157,046 | 6/1979 | O'Malley | 74/763 |

FOREIGN PATENT DOCUMENTS 1177949 10/1964 Fed. Rep. of Germany .
2722891 12/1977 Fed. Rep. of Germany .
2286987 4/1976 France .

Primary Examiner—George H. Krizmanich
Assistant Examiner—Dirk Wright
Attorney, Agent, or Firm—Finnegan, Henderson, Farabow, Garrett & Dunner

[57] ABSTRACT

An automatic transmission suitable for use with vehicles of FF type, including a tandem connection of a fluid torque converter and a gear device with an output gear wheel incorporated therein, a counter transmission device having a counter shaft arranged in parallel with the gear device and having a first gear wheel at its first end closer to the rear end portion of the gear device meshed with the output gear wheel and having a second gear wheel at its second end closer to the front end portion of the gear device, and a differential gear device having an input gear wheel which meshes with the second gear wheel and adapted to drive a pair of front wheel axles of a vehicle.

5 Claims, 4 Drawing Figures

AUTOMATIC TRANSMISSION FOR VEHICLES

This is a continuation of application Ser. No. 943,484, filed 9/18/78, now abandoned.

BACKGROUND OF THE INVENTION

The present invention relates to an automatic transmission for vehicles, and, more particularly, to an automatic transmission for use with vehicles of the FF type, i.e. of the front engine-front drive type.

In an automobile of the FF type, the condition that the drive wheel axles are located close to the engine imposes a great difficulty on the arrangement of an automatic transmission because this requires that the driving end and the driven end of the automatic transmission should be located close to each other. On the other hand, the automatic transmission for other vehicle types, which is generally a tandem connection of a fluid torque converter and a reduction gear mechanism and which sometimes further includes an overdrive gear mechanism, has, as a general structure, its input and output members located at its opposite ends.

SUMMARY OF THE INVENTION

The object of the present invention is to provide an automatic transmission which satisfies the requirement that the output end of the transmission, i.e. the connections for a pair of drive wheel axles, is located close to the input end of the transmission, i.e. its input member connected with the crank shaft of an engine.

In order to accomplish this object, the present invention proposes an automatic transmission for vehicles, comprising: a fluid torque converter having an input member, a pump impeller connected with said input member, a turbine, an output member connected with said turbine, and a stator; a gear device having an input member connected with said output member of said fluid torque converter, an output member, a plurality of planetary gear mechanisms, friction engaging means, and one-way clutches which are changed over so as to provide a plurality of speed ratios between said input and output members of said gear device, and an output gear wheel connected with said output member of said gear device; a counter transmission device having a counter shaft arranged in parallel with said gear device and having first and second ends located respectively closer to said output and input members of said gear device, a first gear wheel supported by said first end of said counter shaft and meshing with said output gear wheel of said gear device, and a second gear wheel supported by said second end of said counter shaft; and a differential gear device having an input gear wheel which meshes with said second gear wheel of said counter transmission device, and a differential gear mechanism.

BRIEF DESCRIPTION OF THE DRAWING

The present invention will become more fully understood from the detailed description given hereinbelow and the accompanying drawings, which are given by way of illustration only, and are not intended to limit the present invention, and wherein.

DESCRIPTION OF THE PREFERRED EMBODIMENT

Figure 1:
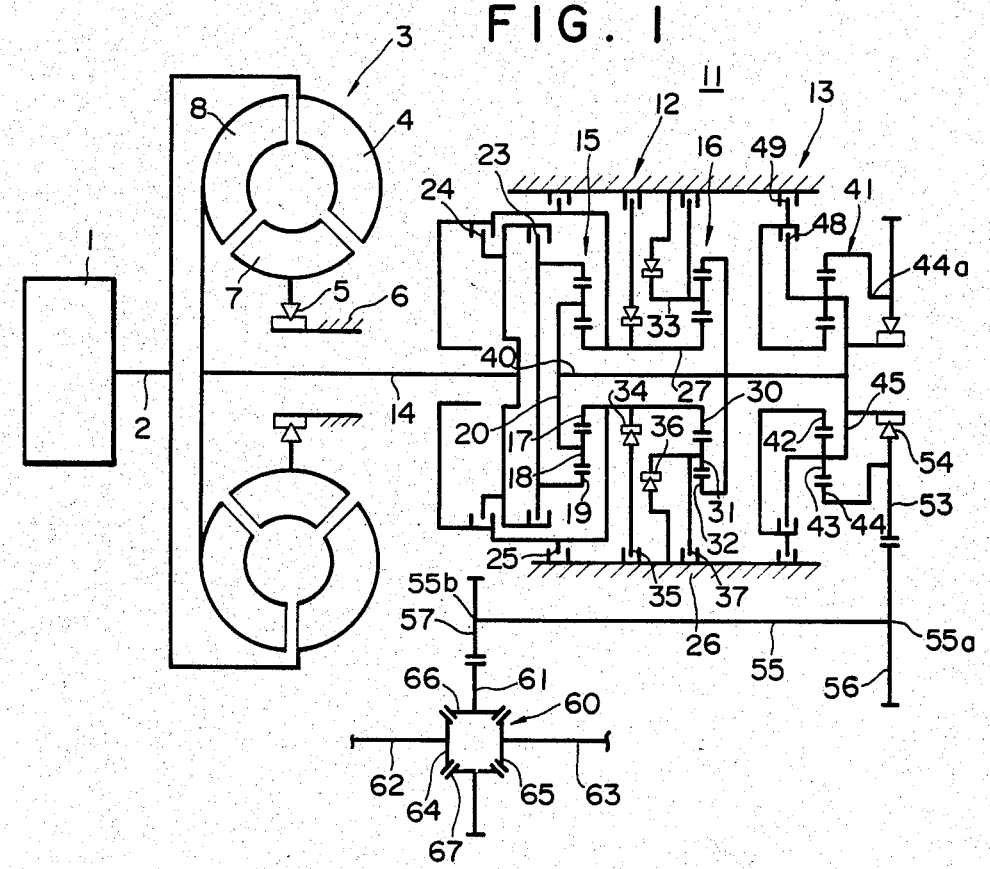
FIG. 1 is a diagrammatical sectional view showing an embodiment of the automatic transmission of the present invention.

Referring to FIG. 1, a block designated by reference numeral 1 schematically indicates an engine which has a crankshaft 2 which also serves as an input shaft of a fluid torque converter 3. The fluid torque converter 3 is of a well-known type which comprises a pump impeller 4 connected with the input shaft 2, a stator 7 supported from a stationary housing 6 by way of a one-way clutch 5, and a turbine 8 supported by an output shaft 14 of the torque converter which also serves as an input shaft of a gear device 11.

The gear device 11 includes an underdrive mechanism 12 and an overdrive mechanism 13. The underdrive mechanism 12 has first and second planetary gear mechanisms 15 and 16. The first planetary gear mechanism 15 has a sun gear 17, planetary pinions 18, a ring gear 19 and a carrier 20 which rotatably supports the planetary pinions 18. A clutch 23 is incorporated so as to control the connection between the input shaft 14 and the ring gear 19. Another clutch 24 is incorporated so as to control the connection between the input shaft 14 and the sun gear 17 or a shaft 27 connected with the sun gear 17. A brake 25 is provided as supported from a stationary housing 26 so as to selectively brake the rotation of the sun gear 17 or the shaft 27.

The second planetary gear mechanism 16 has a sun gear 30, planetary pinions 31, a ring gear 32, and a carrier 33 which rotatably supports the planetary pinions 31. The sun gear 30 is connected with the shaft 27. A one-way clutch 34 and a brake 35 are incorporated in series between the shaft 27 and the housing 26. A one-way clutch 36 and a brake 37 are incorporated in parallel between the carrier 33 and the housing 26. The carrier 20 of the first planetary gear mechanism 15 and the ring gear 32 of the second planetary gear mechanism 16 are both supported by an intermediate shaft 40 aligned with the input shaft 14, said intermediate shaft also serving as an input shaft of an overdrive mechanism 13.

The overdrive mechanism 13 comprises a planetary gear mechanism 41 which has a sun gear 42, planetary pinions 43, a ring gear 44, and a carrier 45 which rotatably supports the planetary pinions 43. The intermediate shaft 40 is connected with the carrier 45. A clutch 48 is incorporated between the sun gear 42 and the carrier 45 so as to selectively connect these two elements. A brake 49 is provided as supported by the housing 26 so as to selectively brake the rotation of the sun gear 42. The ring gear 44 substantially provides an output member of the overdrive mechanism 13 or the output member of the gear device 11, such as a hollow shaft 44a. An output gear wheel 53 is supported by the output shaft 44a. A one-way clutch 54 is incorporated between the carrier 45 and the output shaft 44a or the output gear wheel 53.

In parallel with the gear device 11 is arranged a counter shaft 55 which has a first end 55a and a second end 55b located respectively closer to the output shaft 44a and the input shaft 14 of the gear device 11. The first end 55a of the counter shaft 55 supports a first gear wheel 56 which meshes with the output gear wheel 53 of the gear device 11. The second end 55b of the counter shaft 55 supports a second gear wheel 57. Adjacent to the second end 55b of the counter shaft 55 is provided a differential gear device 60 having an input gear wheel 61 which meshes with the second gear wheel 57 supported by the second end 55b of the counter shaft 55. The differential gear device is of a wellknown type having two pairs of bevel gears 64, 65, 66, and 67, wherein a pair of bevel gears 66 and 67 support the input gear wheel 61 while the other pair of bevel gears 64 and 65 are respectively connected with a pair of front wheel axles 62 and 63.

Table 1 shows the operating conditions of the clutches, one-way clutches and brakes in various shift conditions.

TABLE 1

| SHIFT POSITION | FRICTION ENGAGING MEANS | | | | | | | | | |
|---|---|---|---|---|---|---|---|---|---|---|
| | CLUTCH 23 | CLUTCH 24 | BRAKE 25 | BRAKE 35 | BRAKE 37 | ONE-WAY CLUTCH 34 | ONE-WAY CLUTCH 36 | CLUTCH 48 | BRAKE 49 | ONE-WAY CLUTCH 54 |
| FORWARD | | | | | | | | | | |
| D RANGE | | | | | | | | | | |
| 1st Speed | E | | | | | | (E) | | | (E) |
| 2nd Speed | E | | | E | | E | | | | (E) |
| 3rd Speed | E | E | | | | | | E | | e |
| 4th Speed | E | E | | | | | | | E | |
| 2 RANGE | | | | | | | | | | |
| 1st Speed | E | | | | E | | E | | | (E) |
| 2nd Speed | E | | E | | | | | E | | e |
| L RANGE | E | | | | E | | e | E | | e |
| REVERSE | | E | | | E | | | E | | |

In Table 1, "E" shows that the corresponding clutch, one-way clutch or brake is engaged. However, "(E)" shows that the corresponding one-way clutch is engaged only in the engine drive condition while it is disengaged in the engine brake condition. Furthermore, "e" shows that although the corresponding one-way clutch is engaged in the engine drive condition, its engagement is not essential because positive power transmission is guaranteed by clutch or brake incorporated in parallel with one-way clutch.

By referring to FIG. 1 in connection with Table 1, the operation of the automatic transmission shown in FIG. 1 in various shift conditions will be apparent for one of ordinary skill in the art.

Figure 2:
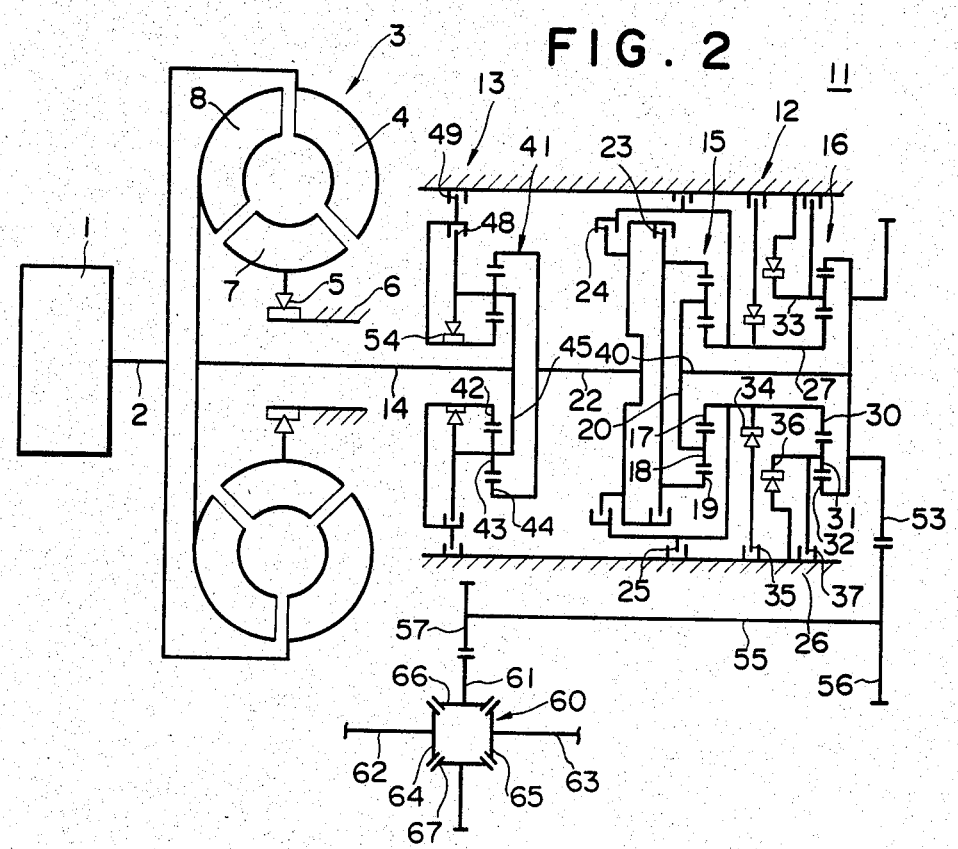
FIG. 2 is a view similar to FIG. 1 showing another embodiment of the present invention.

FIG. 2 is a view similar to FIG. 1 showing another embodiment of the present invention. In the embodiment shown in FIG. 2, the order in the axial arrangement of the reduction gear mechanism 12 and the overdrive mechanism 13 is changed over so that the overdrive mechanism 13 is positioned ahead of the reduction gear mechanism 12, that is, so that the overdrive mechanism 13 is positioned between the fluid torque converter 3 and the reduction gear mechanism 12. In FIG. 2 the portions corresponding to those shown in FIG. 1 are designated by the same reference numerals. In accordance with this modification, the input shaft 14 of the gear device 11 is connected with the carrier 45 of the overdrive planetary gear mechanism 41, while the ring gear 44 of the overdrive planetary gear mechanism 41 is connected with the input member 22 of the reduction gear mechanism 12. Furthermore, the output gear wheel 53 is now mounted to the ring gear 32 of the planetary gear mechanism 16. Table 1 is also applicable to the embodiment shown in FIG. 2.

Figure 3:
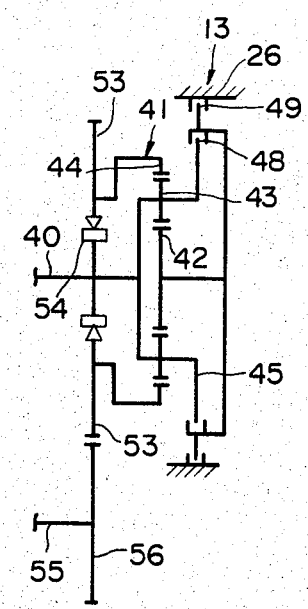
FIGS. 3 and 4 are views corresponding to a portion of the automatic transmission shown in FIG. 1, showing two modifications to be incorporated in the corresponding portion.

FIG. 3 corresponds to a part of the gear device 11 shown in FIG. 1, showing a modification with regard to the structure for mounting the output gear wheel 53. In this modification the one-way clutch 54 and the output gear wheel 53 are positioned between the planetary gear mechanism 16 and the overdrive mechanism 13. Also in FIG. 3 the portions corresponding to those shown in FIG. 1 are designated by the same reference numerals. In accordance with the change of the mounting position of the one-way clutch 54 and the output gear wheel 53, the overdrive mechanism 13 is also slightly modified so that the clutch 48 and the brake 49 are arranged behind the planetary gear mechanism 41 of the overdrive mechanism as viewed in the axial direction.

Figure 4:
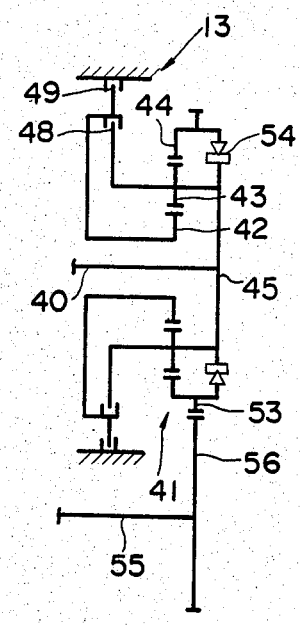

FIG. 4 is a view similar to FIG. 3 showing another modification applicable to a part of the automatic transmission shown in FIG. 1. This modification does not substantially change the structure shown in FIG. 1, except that the output gear wheel 53 is formed rather as an annular gear arranged closely to the ring gear 44 of the planetary mechanism 41 which provides the overdrive mechanism 13. Also in FIG. 4, the portions corresponding to those shown in FIG. 1 are designated by the same reference numerals.

As apparent from comparison of the embodiments shown in FIGS. 1 and 2, the overdrive mechanism 13 may be easily deleted from the automatic transmission of the present invention.

Although the invention has been shown and described with respect to some preferred embodiments thereof, it should be understood by those skilled in the art that various changes and omissions of the form and detail thereof may be made therein without departing from the scope of the invention.

We claim:
1. An automatic transmission, comprising:
   (a) a fluid torque converter having an input member, a pump impeller drivingly connected with said input member, a turbine runner, a first output member drivingly connected with said turbine runner, and a stator;
   (b) a reduction gear mechanism, including:
      (i) a first rotary member at an input end of said reduction gear mechanism drivingly connected with said first output member;
      (ii) a first planetary gear mechanism having a first sun gear, a first ring gear, first planetary pinions and a first carrier;
      (iii) a second rotary member;
      (iv) a second planetary gear mechanism having a second sun gear, a second ring gear, second planetary pinions, and a second carrier;

(v) said first sun gear being drivingly connected with said second sun gear and with said second rotary member;

(vi) a first clutch selectively connecting said first rotary member with said second rotary member;

(vii) a second clutch selectively connecting said first rotaty member with said first ring gear;

(viii) a first brake selectively braking said secondary rotary member;

(ix) a second brake selectively braking said first and second sun gears; and (x) a third brake selectively braking said second carrier;

(c) an overdrive gear mechanism, including:

(i) a third planetary gear mechanism having a third sun gear, a third ring gear, third planetary pinions, and a third carrier;

(ii) a third rotary member drivingly connected with said third sun gear;

(iii) a second output member drivingly connected with said third ring gear;

(iv) a third clutch selectively connecting said third rotary member with said third carrier; and (v) a fourth brake selectively braking said third rotary member;

(d) an intermediate shaft drivingly interconnecting said first carrier, said second ring gear and said third carrier;

(e) an output gear wheel disposed between said reduction gear mechanism and said overdrive gear mechanism and drivingly connected to said second output member;

(f) a counter transmission device including:

(i) a counter shaft disposed parallel to said intermediate shaft;

(ii) a first gear wheel drivingly secured to said countershaft at one end thereof and drivingly connected to said output gear wheel; and (iii) a second gear wheel drivingly secured to said countershaft at the other end thereof proximate said input end of said reduction gear mechanism; and (g) a differential gear means drivingly connected to said second gear wheel.

2. An automatic transmission comprising:

a fluid torque converter having an input member, a pump impeller connected with said input member, a turbine, an output member connected with said turbine, and a stator;

a gear device having an input member connected with said output member of said fluid torque converter, an output member, first, second and third planetary gear mechanisms coaxially arranged in axial proximity, friction engaging means, one-way clutches, said gear device including a reduction gear mechanism including said first and second planetary gear mechanisms and an overdrive gear mechanism including said third planetary gear mechanism, said overdrive mechanism being positioned behind said reduction gear mechanism as viewed from said fluid torque converter, an intermediate shaft which extends along the common axis of and over the axial length of said first, second and third planetary gear mechanisms so as to integrate said first and second planetary gear mechanisms into said reduction gear mechanism and so as to connect said reduction gear mechanism to said overdrive gear mechanism, and an output gear wheel connected with said output member of said gear device, said third planetary gear mechanism having a sun gear, planetary pinions, a carrier which rotatably supports said planetary pinions of said third planetary gear mechanism and serves as the input member of said overdrive gear mechanism, a ring gear which serves as the output member of said overdrive mechanism, a clutch which selectively locks up the relative movement between said sun gear and said carrier of said third planetary gear mechanism, a brake which selectively brakes the rotation of said sun gear of said third planetary gear mechanism, and a one-way clutch incorporated between said carrier and said ring gear of said third planetary gear mechanism said output gear wheel being supported by said ring gear of said third planetary gear mechanism;

a counter transmission device having a countershaft arranged in parallel with said gear device and having first and second ends located respectively closer to said output and input members of said gear device, a first gear wheel supported by said first end of said countershaft and meshing with said output gear wheel of said gear device, and a second gear wheel supported by said second end of said countershaft; and a differential gear having an input gear wheel which meshes with said second gear wheel of said counter transmission device.

3. An automatic transmission according to claim 2, wherein said ring gear of said third planetary gear mechanism has an extension located at the remote end of said gear device as viewed from said fluid torque converter, and wherein said output gear wheel is located at the remote end of said gear device as viewed from said fluid torque converter as supported by said ring gear of said third planetary gear mechanism by way of said extension.

4. An automatic transmission according to claim 2, wherein said ring gear of said third planetary gear mechanism has an extension located between said reduction gear mechanism and said overdrive gear mechanism, and wherein said output gear wheel is located between said reduction gear mechanism and said overdrive gear mechanism as supported by said ring gear of said third planetary gear mechanism by way of said extension.

5. An automatic transmission with an overdrive gear mechanism, comprising:

(a) A torque converter coaxially connected to an input shaft from an engine, said torque converter having an output shaft and transmitting power to said output shaft;

(b) a reduction gear mechanism drivingly connected to said torque converter output shaft whereby a reduction gear ratio equal to or more than one is obtained, said reduction gear mechanism comprising plural planetary gear mechanisms, friction engaging elements and an output shaft, said reduction gear mechanism transmitting power to said reduction gear mechanism output shaft;

(c) an overdrive gear mechanism drivingly connected to said reduction gear mechanism output shaft whereby a reduction gear ratio of less than one is obtained, said overdrive gear mechanism comprising a planetary gear mechanism and plural friction engaging elements, said planetary gear mechanism comprising a carrier drivingly connected to said reduction gear mechanism output shaft, a planetary pinion, a sun gear, and a ring gear as an output element;

(d) a transfer device arranged between said reduction gear mechanism and said overdrive gear mechanism, said transfer device comprising a driving gear drivingly connected to the output element of said overdrive gear mechanism, a driven gear engaged to said driving gear, and a countershaft coaxially connected to said driven gear and in parallel with said reduction gear mechanism output shaft; and (e) an output gear coaxially connected to said countershaft.

* * * * *